US 6,733,417 B2

(12) United States Patent
Ajimoto

(10) Patent No.: US 6,733,417 B2
(45) Date of Patent: May 11, 2004

(54) CONTROL APPARATUS FOR CONTINUOUSLY VARIABLE TRANSMISSION

(75) Inventor: Keisuke Ajimoto, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/234,131

(22) Filed: Sep. 5, 2002

(65) Prior Publication Data

US 2003/0045395 A1 Mar. 6, 2003

(30) Foreign Application Priority Data

Sep. 6, 2001 (JP) .......................... 2001-269729

(51) Int. Cl.⁷ ........................ B60K 41/12; F16H 59/00
(52) U.S. Cl. ................. 477/45; 474/11; 474/28
(58) Field of Search ................ 477/45, 44, 37, 477/38; 474/11, 28

(56) References Cited

U.S. PATENT DOCUMENTS

| 4,674,363 A | * | 6/1987 | Miyawaki ..................... 477/49 |
| 4,841,814 A | * | 6/1989 | Satoh ........................... 477/45 |
| 4,887,428 A | * | 12/1989 | Iino ............................. 60/468 |
| 5,012,696 A | * | 5/1991 | Miyawaki ..................... 477/45 |
| 5,052,980 A | * | 10/1991 | Itoh et al. ..................... 474/11 |
| 5,056,637 A | * | 10/1991 | Miyawaki et al. ............ 477/39 |
| 6,183,391 B1 | * | 2/2001 | Iijima .......................... 477/62 |

FOREIGN PATENT DOCUMENTS

JP          11-82725          3/1999

* cited by examiner

*Primary Examiner*—Tisha D Lewis
(74) *Attorney, Agent, or Firm*—McGinn & Gibb, PLLC

(57) ABSTRACT

When an ignition switch is turned off to stop an engine, a control apparatus of a continuously variable transmission places a line pressure regulating valve in a fully draining condition to reduce a load of a hydraulic pump by maintaining an electric power supply to the line pressure regulating valve, a shift control pressure regulating valve and the control apparatus.

3 Claims, 3 Drawing Sheets

CONTROL APPARATUS FOR CONTINUOUSLY VARIABLE TRANSMISSION

BACKGROUND OF THE INVENTION

1. Field of the Invention

The present invention relates to a control apparatus for a continuously variable transmission and more particularly to a control apparatus for a belt type continuously variable transmission having a hydraulic pump driven by an engine.

2. Discussion of Prior Arts

A belt-type continuously variable transmission used for an automobile power transmission apparatus includes a primary shaft on a drive side, a primary pulley provided on the primary shaft and of which width of a groove of the pulley is variable, a secondary shaft on a driven side, a secondary pulley provided on the secondary shaft and of which width of a groove of the pulley is variable, and a drive belt looped over these two pulleys. Engine speed is continuously changed by changing a ratio of winding diameters of the drive belt on the respective pulleys and is transmitted to the secondary shaft.

Hydraulic pressure is supplied from a hydraulic pump driven by an engine to respective pulleys and the groove width of the respective pulleys is changed by controlling the hydraulic pressure. The secondary pulley is subjected to a hydraulic pressure supplied from the hydraulic pump, namely a line pressure and the groove width of the secondary pulley is changed by regulating the line pressure with a line pressure control valve. Further, the primary pulley is subjected to a shift control pressure regulated by a shift control pressure regulating valve and the groove width of the primary pulley is changed by regulating this shift control pressure. When the groove width of the respective pulleys is changed, the ratio of winding diameters of the drive belt on the respective pulleys is changed and the engine speed is continuously shifted and is transmitted to the secondary shaft.

A duty-solenoid valve or a linear solenoid valve are used for the shift control pressure regulating valve and the line pressure control valve. The duty-solenoid valve is a valve which is subjected to a so-called duty-control by command signals from a control unit and the linear solenoid valve is a valve of which valve opening ratio is regulated in accordance with an electric current value supplied from a control unit. As disclosed in Japanese Patent Application Laid-open No. Toku-Kai-Hei 11-82725, these solenoid operated valves are established in such a manner that the shift control pressure and the line pressure have a peak value respectively, when a current value supplied to these valves is zero. This is for holding the tension of the drive belt to prevent the transmission from being damaged when a power supply is shut off during running.

However, in thus constituted continuously variable transmission, when an operator of a vehicle turns an ignition switch of an engine off to stop the engine, the operator sets an electric power to be supplied to the respective solenoid valves to zero or set a power source of the control apparatus itself of the continuously variable transmission to a selfshut condition for the purpose of saving power. Accordingly, when the operator of the vehicle turns the ignition switch off to stop the engine, since the respective solenoid valves hold the shift control pressure and the line pressure at a maximum value respectively, the load of the hydraulic pump abruptly increases. As a result, the frequency of chances of the engine stopping in an overlap position where both of the intake and exhaust valves are held open increases. If the engine stops in an overlap position, exhaust gas in the exhaust manifold enters the intake manifold through the intake and exhaust valves in an open condition and as a result the restartability of the engine is exacerbated.

SUMMARY OF THE INVENTION

It is an object of the present invention to provide a control apparatus of a continuously variable transmission having no adverse effect on the restartability of an engine of a vehicle. In order to achieve the object, the control apparatus includes an engine switch member for controlling a start and a stop of the engine, a vehicle speed detecting means for detecting a vehicle speed of the vehicle, an engine speed detecting means for detecting an engine speed of, a line pressure reduction mode establishing means for reducing the line pressure, a line pressure reduction mode establishing means for establishing the line pressure to the line pressure reduction mode when the vehicle speed detected by the vehicle speed detecting means is smaller than a first specified value and when the engine speed detected by the engine speed detecting means is smaller than a second specified value and when the engine switch member is turned off to stop the engine.

DESCRIPTION OF THE PREFERRED EMBODIMENT

Figure 1:
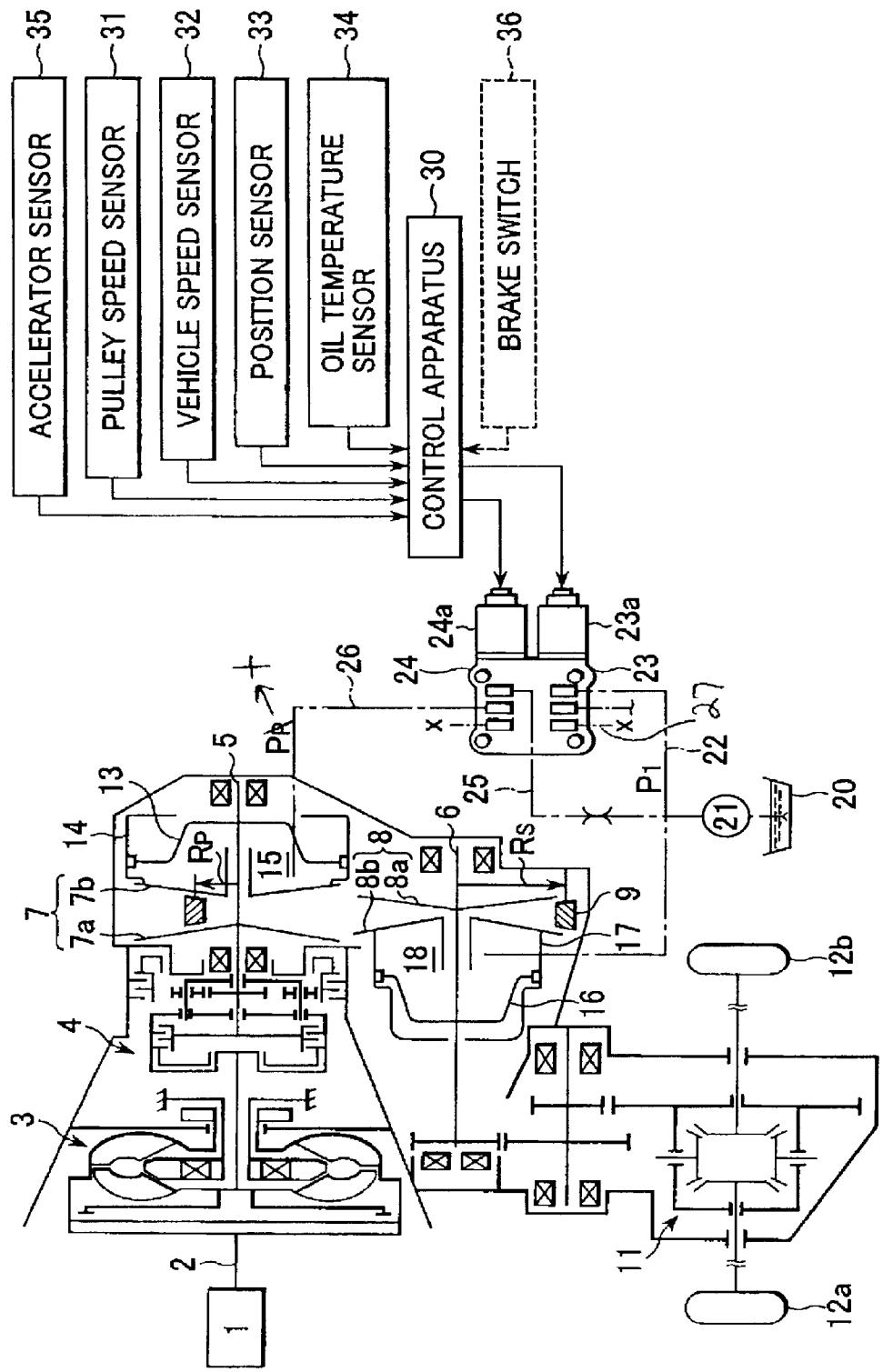
FIG. 1 is a schematic skeleton diagram showing a belt-type continuously variable transmission having a control apparatus according to an embodiment of the present invention.

Referring now to FIG. 1, a belt-type continuously variable transmission includes a primary shaft 5 and a secondary shaft 6 provided in parallel with the primary shaft 5. The rotation of a crankshaft 2 of an engine 1 is transmitted to the primary shaft 5 through a torque converter 3 and a forward and reverse changeover apparatus 4. A primary pulley 7 provided on the primary shaft 5 is constituted by a fixed sheave 7a integrally formed with the primary shaft 5 and a displaceable sheave 7b slidably mounted through a ball spline on the primary shaft 5 opposite to the fixed sheave 7a so as to vary the width of a groove formed by these sheaves 7a, 7b of the primary pulley 7. Similarly, a secondary pulley 8 is provided on the secondary shaft 6. The secondary pulley 8 is constituted by a fixed sheave 8a integrally formed with the secondary shaft 6 and a displaceable sheave 8b slidably mounted on the secondary shaft 6 opposite to the fixed sheave 8a so as to vary the width of a groove formed by these sheaves 8a, 8b of the secondary pulley 8.

A drive belt 9 is looped over the primary pulley 7 and the secondary pulley 8. The rotation speed of the primary shaft 7 is continuously varied by changing ratios of the winding diameters of the drive belt 9 to the respective pulleys. Letting a winding diameter of the drive belt 9 to the primary pulley 7 be $R_p$ and letting a winding diameter of the drive belt 9 to the secondary pulley 8 be $R_s$, a speed reduction ratio R is expressed as $R=R_s/R_p$.

The rotation of the secondary shaft 6 is transmitted to a drive wheel 12a, 12b through gear trains including a reduction gear and a differential 11.

To change the groove width of the primary pulley 7, a plunger 13 is secured to the primary shaft 5 and a primary cylinder 14 slidably contacts the outer periphery of the plunger 13. The primary cylinder 14 is secured to the displaceable sheave 7b. Thus, a primary oil chamber 15 is formed by the plunger 13 and the primary cylinder 14. On the other hand, a plunger 16 is secured to the secondary shaft 6 and a secondary cylinder 17 slidably contacts the outer periphery of the plunger 16. The secondary cylinder 17 is secured to the displaceable sheave 8b. Thus, a secondary oil chamber 18 is formed by the plunger 16 and the secondary cylinder 17. Accordingly, when working fluid is fed to the primary oil chamber 15 and the volume of the primary oil chamber 15 increases, the displaceable sheave 7b is displaced towards the fixed sheave 7a together with the primary cylinder 14 to reduce the groove width and when the volume of the primary oil chamber 15 decreases, the groove width increases. Further, when working fluid is fed to the secondary oil chamber 18 and the volume of the secondary oil chamber 18 increases, the displaceable sheave 8b is displaced towards the fixed sheave 8a together with the secondary cylinder 17 to reduce the groove width and when the volume of the secondary oil chamber 18 decreases, the groove width increases. Groove widths of the respective pulleys are established by regulating a shift control pressure $P_t$ fed to the primary oil chamber 15 on the primary side and a line pressure $P_l$ fed to the secondary oil chamber 18 on the secondary side.

Working fluid is supplied from an oil pan 20 to the respective chambers 15, 18 by a hydraulic pump 21 driven by the crankshaft 2 of the engine 1. The discharge port of the hydraulic pump 21 is connected with a line pressure passage 22 which communicates with the secondary oil chamber 18. The line pressure passage 22 also communicates with a line pressure port of a line pressure regulating valve 23. The line pressure regulating valve 23 serves as regulating the line pressure $P_l$ supplied to the secondary oil chamber 18 to a pressure corresponding to a transmission power of the drive belt 9. That is, when the engine power is large such as at hill climbing, sharp acceleration and the like, the line pressure $P_l$ is raised to prevent the drive belt from slipping. When the engine power is small, the line pressure $P_l$ is lowered to minimize power loss and to improve transmission efficiency.

Further, the line pressure passage 22 is connected with a line pressure port of a shift control pressure regulating valve 24 through a communicating oil passage 25 and a shift control pressure port communicates with the primary oil chamber 15 through a shift control pressure passage 26. This shift control pressure regulating valve 24 regulates a shift control pressure $P_t$ according to target speed ratios, vehicle speeds and the like and changes the groove width of the primary pulley 7 to control the speed ratio R.

The line pressure regulating valve 23 is a proportional solenoid valve in which the line pressure $P_l$ is regulated by controlling a current value supplied from a control unit 30 to the solenoid 23a. In more detail, the line pressure regulating valve 23 changes the line pressure $P_l$ by regulating the amount of drain of working fluid supplied from the hydraulic pump 21 to the line pressure passage 22. When the current value supplied to the solenoid 23a is zero, the line pressure regulating valve 23 is fully closed and produces a maximum line pressure $P_{lmax}$. Next, as the current value increases from the zero condition, working fluid is gradually drained to a lubrication oil passage 27 and when the current value is maximum, the amount of drain reaches a maximum value. At this moment, the line pressure $P_l$ is established to a minimum line pressure $P_{lmin}$. Similarly, the shift control pressure regulating valve 24 is a proportional solenoid valve, in which the shift control pressure $P_t$ is regulated by controlling a current value supplied from the control apparatus 30 to the solenoid 24a. That is, the shift control pressure regulating valve 24 changes the shift control pressure $P_t$ by regulating the amount of drain of working fluid supplied from the line pressure passage 22. When the current value sent to the solenoid 24a is zero, the shift control pressure passage 26 is connected with the line pressure passage 22 and as a result the shift control pressure $P_t$ is established to a maximum pressure $P_{tmax}$. With an increase of the current value, when the amount of drain of working fluid in the shift control passage 26 gradually increases and when the current value is maximum, the shift control pressure $P_t$ is established to a minimum pressure $P_{tmin}$. Since the shift control pressure $P_t$ is reduced to the line pressure $P_l$, the shift control pressure $P_t$ never exceeds the line pressure $P_l$. Since the pressure receiving area of the pressure chamber 15 is established to be larger than that of the pressure chamber 18, the clamping force of the pulley against the drive belt 9 is larger at the primary pulley 7 than at the secondary pulley 8.

The control apparatus 30 inputs miscellaneous signals such as a signal indicative of a revolution speed $N_e$ of the engine 1 from an engine speed sensor 31, a signal indicative of a throttle valve opening angle from a throttle valve opening angle sensor 32, a signal indicative of a revolution speed $N_p$ of the primary pulley 7 from a primary pulley speed sensor 33, a signal indicative of a revolution speed $N_s$ of the secondary pulley 8 from a secondary pulley speed sensor 34, a signal indicative of a vehicle speed V from a vehicle speed sensor 35 and a signal indicative of a position of a selector lever (not shown) from a position sensor 36, respectively. The control apparatus 30 has a central processing unit for calculating current values to be fed to the respective solenoids 23a, 24a based on the signals from the respective sensors and memories for storing control programs, formulas, table data and the like.

The line pressure regulating valve 23, the shift control pressure regulating valve 24 and the control apparatus 30 are respectively connected with a battery (not illustrated in FIG. 1) mounted on the vehicle through a source relay (not illustrated in FIG. 1) and those are operated by electric power supplied from the battery.

An input coil (not illustrated in FIG. 1) of the source relay is connected with the battery through an emitter (not illustrated in FIG. 1) and a collector ∈ (not illustrated in FIG. 1) of a transistor (not illustrated in FIG. 1) provided in the control apparatus 30. Further, a base (not illustrated in FIG. 1) of the transistor is connected with the battery through an ignition switch (not illustrated in FIG. 1). Accordingly, when the ignition switch (not illustrated in FIG. 1) is turned on by a vehicle operator, the source relay is closed to supply power to the line pressure regulating valve 23, the shift control pressure regulating valve 24 and the control apparatus 30.

Further, the base of the transistor is constituted so as to receive a voltage supply from the control apparatus 30 through a diode (not illustrated in (FIG. 1). Accordingly, even in case where the ignition switch is turned off, since voltage is supplied from the control apparatus 30 to the base, the source relay is held closed and as a result power is continued to be supplied to the line pressure regulating valve 23, the shift control pressure regulating valve 24 and the control apparatus 30. The ignition switch energizes and deenergizes an ignition circuit of an ignition system of the engine 1. When the ignition switch is turned on, the engine 1 starts and when it is turned off, the engine 1 stops.

Figure 2:
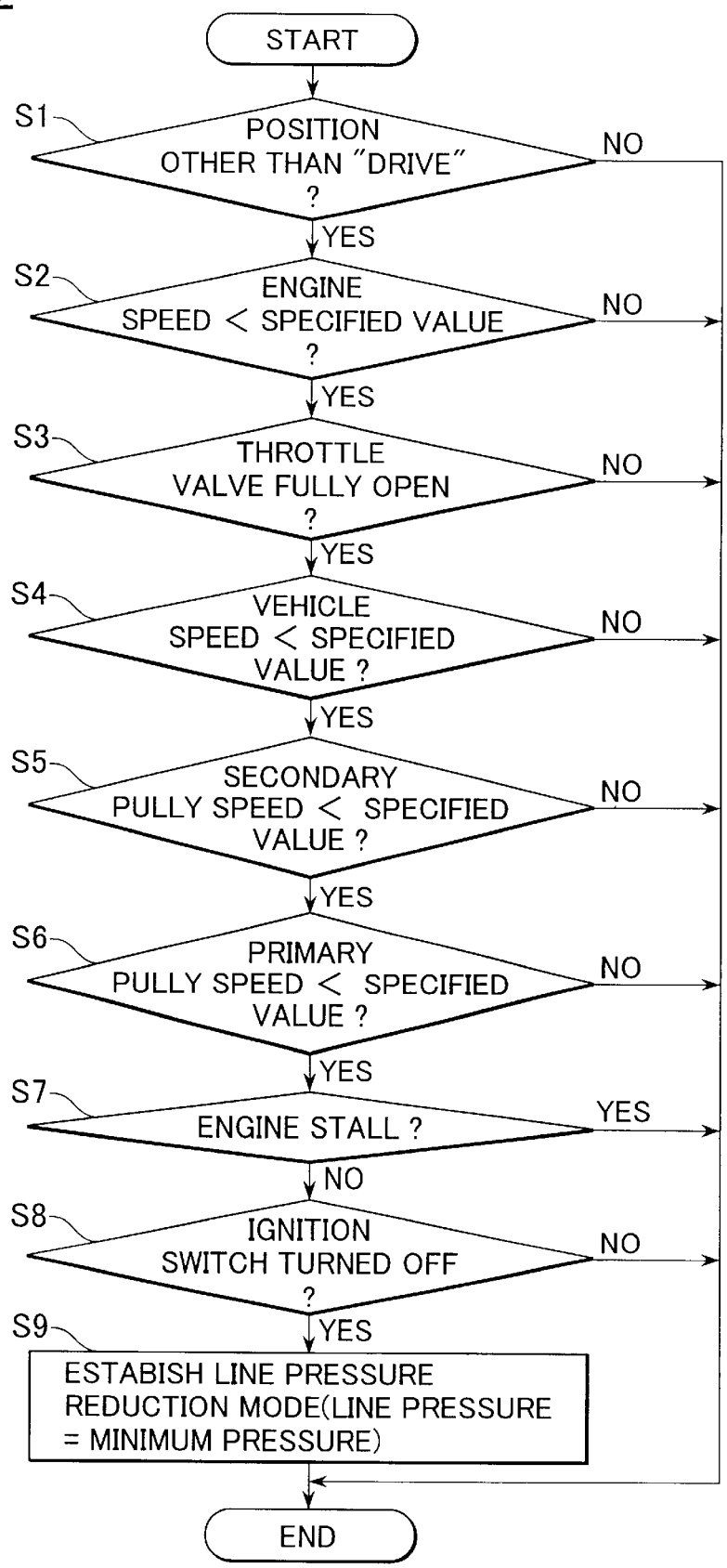
FIG. 2 is a flowchart showing steps for establishing a line pressure to a line pressure reduction mode in the control apparatus of FIG. 1.

When the vehicle comes to a standstill and the ignition switch 42 is turned off, the control apparatus 30 supplies voltage to the base B to maintain the source relay in a closed condition. As a result, power is continued to be supplied to the line pressure regulating valve 23, the shift control pressure regulating valve 24 and the control apparatus 30. Further, at this moment the control apparatus 30 is established to a line pressure reduction mode in which a current supplied to the solenoid 23a is maximum and a line pressure $P_l$ is lowest. In the following flowchart shown in FIG. 2, the steps for establishing the line pressure reduction mode will be described. This routine is executed every 10 milliseconds.

First, at a step S1, it is judged whether or not the position detected by the position sensor 36 of the selector lever is a position other than a drive (D) position. If it is judged that the selector lever is in a position other than a drive (D) position (for example parking (P) position or neutral (N) position), at a step S2 it is judged whether or not an engine speed $N_e$ detected by the engine speed sensor 31 is smaller than a specified number of revolution, that is, the engine speed $N_e$ is smaller than a number of revolution at idling.

If it is judged at the step S2 that the engine speed $N_e$ is smaller than the specified value, the program goes to a step S3 where it is judged whether or not a throttle valve opening angle detected by the throttle valve opening angle sensor 32 is fully closed. This is because even if the engine speed $N_e$ is smaller than the specified value, there is a case where the engine speed goes up thereinafter to a larger speed than the specified value. Accordingly, in case where it is judged that the throttle is open, the program leaves the routine.

If it is judged at the step S3 that the throttle is fully closed, the program goes to a step S4 where it is judged whether or not a vehicle speed V detected by the vehicle speed sensor 35 is smaller than a specified value, that is, the vehicle is in a standstill.

If it is judged at the step S4 that the vehicle speed V is smaller than the specified value and the vehicle is in a standstill, the program goes to a step S5 where it is judged whether or not a secondary pulley speed $N_s$ detected by the secondary pulley speed sensor 34 is smaller than a specified value. If it is judged that the secondary pulley speed $N_s$ is smaller than the specified value, the program goes to a step S6 where a primary pulley speed $N_p$ detected by the primary pulley speed sensor 33 is smaller than a specified value, that is, the primary pulley speed $N_p$ is smaller than a lowest shift speed. Thus, by confirming that the respective pulleys 7, 8 do not rotate, the drive belt 9 is prevented from slipping.

If it is judged at the step S6 that the primary pulley $N_p$ is smaller than the specified value, the program goes to S7 where it is judged whether or not the engine stalls. The engine stall is a state of an engine in which the engine speed $N_e$ goes down to such a level as being unable to maintain the engine speed and that state continues for a specified time. If the line pressure reduction mode is established during engine stall, an ON-and-OFF of the ignition switch 42 is repeated and as a result electric power is wasted. Accordingly, in case where it is judged at the step S7 that the engine has stalled, the program leaves the routine.

Next, if it is judged at the step S7 that the engine has not stalled, the program goes to a step S8 in which it is judged whether or not the ignition switch 42 has been changed over from ON to OFF. In case where the ignition switch 42 is of a mechanical type, in order to prevent chatterings or erroneous operations due to a sudden shutoff, it is judged that the ignition switch has been changed over from ON to OFF when the ignition switch 42 is turned off and that state continues for a specified time.

When it is judged at the step S8 that the ignition switch 42 has been changed over from ON to OFF, that is, as a result of all affirmative judgments at the steps S1 to S8 when it is judged that the vehicle is in surely a standstill, the control apparatus 30 establishes a line pressure to a line pressure reduction mode at a step S9. In case where either one of those conditions described in steps S1 to S8 is not satisfied, the routine is repeated without establishing the line pressure to the line pressure reduction mode.

When the line pressure is established to the line pressure reduction mode, the control apparatus 30 increases the current supplied to the solenoid coil 23a up to a maximum value and reduces the line pressure $P_1$ to a minimum pressure. That is, since the line pressure regulating valve 23 is fully open and the line pressure $P_1$ is drained to the lubrication oil passage 27, the load of the hydraulic pump 21 driven by the crankshaft of the engine 1 is reduced. Consequently, when the ignition switch 42 is turned off and the engine 1 stops, the belt-type continuously variable transmission gives a reduced friction to the engine 1.

Thus, the control apparatus according to the present invention of the continuously variable transmission reduces a load of the hydraulic pump 21 by placing the line pressure regulating valve 23 in a fully draining condition when the ignition switch 42 is turned off to stop the engine 1. As a result, while the engine 1 runs by inertia after the ignition switch 42 is turned off, a friction given to the engine 1 is reduced. The reduced friction gives a smaller chance to stop the rotation of the engine 1 in an overlap condition of valves. That is, when the engine 1 is in a standstill, such a condition that either intake or exhaust valves are closed is produced. As a result, exhaust gas is prevented from coming into an intake manifold when the engine stops and in the engine 1 connected with the belt type continuously variable transmission its startability is prevented from being exacerbated.

Figure 3:
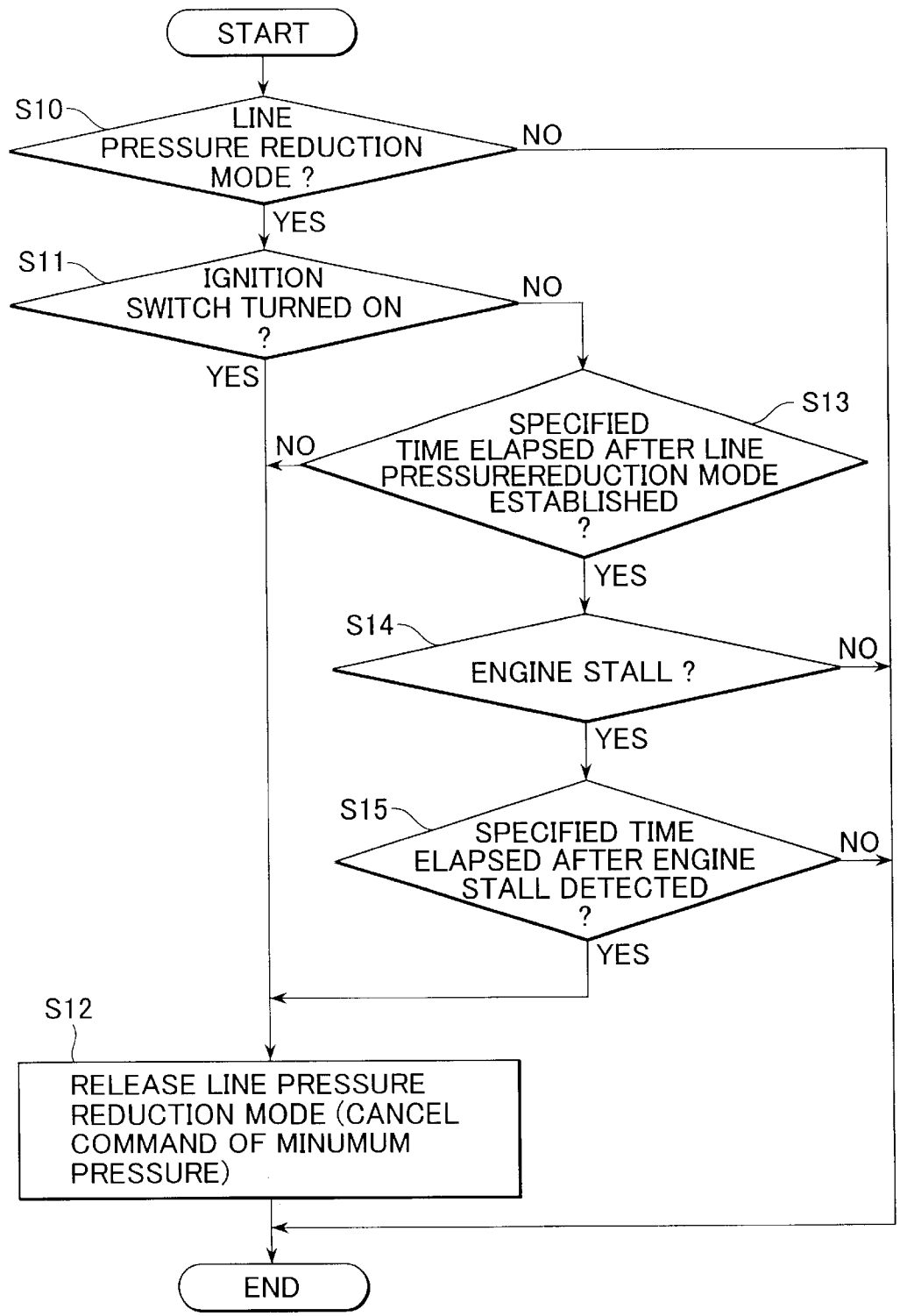
FIG. 3 is a flowchart showing steps for releasing a line pressure from a line pressure reduction mode in a control apparatus of FIG. 1.

Next, steps for releasing the line pressure reduction mode will be described according to a flowchart shown in FIG. 3.

First, at a step S10 it is judged whether or not the control apparatus 30 has been set to a line pressure reduction mode. If the control apparatus 30 has been set to a line pressure reduction mode, the program goes to a step S11 where it is judged whether or not the ignition switch 42 has been changed over from an OFF position to an ON position. At this moment, in the same way as the case of the step S8 shown in FIG. 2, in order to prevent chatterings or erroneous operations due to a sudden break, it is judged that the ignition switch 42 has been changed over from an OFF position to an ON position when a specified time has elapsed since the ignition switch 42 is turned on. Then, when it is judged at the step S11 that the ignition switch 42 has been changed over from OFF to ON (this means that a vehicle operator has an intention to start the engine), the program goes to a step S12 the line pressure reduction mode is released.

On the other hand, in case where it is judged at the step S11 that the ignition switch 42 has not been changed over from an OFF position to an ON position, the program goes to a step S13 where it is judged whether or not a specified time has elapsed since the line pressure reduction mode is set. When it is judged that a specified time has elapsed since the line pressure reduction mode is set, the program goes to the step S12 where the line pressure reduction mode is released. Thus, since the line pressure reduction mode is released unconditionally after a specified time has elapsed since the line pressure reduction mode is set, a power supplied to the solenoid 23$a$ to hold the line pressure $P_1$ at a minimum value can be saved.

Further, in case where it is judged at the step S13 that a specified time has not elapsed since the line pressure reduction mode is set, the program goes to a step S14 where it is judged whether or not the engine has stalled. If it is judged that the engine has stalled, the program goes to a step S15 in which it is judged whether or not a specified time has elapsed since the engine stall is judged. The specified time at the step S15 is equivalent to a time needed for the line pressure regulating valve 23's changing the line pressure $P_1$ from a maximum pressure to a minimum pressure. That is, the steps S14, S15 minimizes a time for holding the line pressure $P_1$ at a minimum pressure for the purpose of reducing a power supplied to the solenoid 23$a$ and preventing a dead battery. Accordingly, when it is judged at the step S15 that a specified time has elapsed after the engine stall is detected, the program goes to the step S12 where the line pressure reduction mode is released. In case where it is judged at the step S10 that the control apparatus has not been set to the line pressure reduction mode, or in case where it is judged at the S14 that the engine has not stalled, or in case where it is judged at the step S15 that a specified time has not yet elapsed since the engine stall is detected, the program leaves the routine.

A period of time during which the control apparatus 30 holds a power supply after the ignition switch is turned off, that is a selfshut period, is established to a longer time than a duration time of the line pressure reduction mode. Hence, after the ignition switch is turned off, the selfshut period finishes after the line pressure reduction mode is carried out. Further, when the selfshut period elapses, the control apparatus 30 stops supplying voltage to the base of the transistor to turn the source relay off. As a result, the power supply to the control apparatus 30, the respective regulating valves 23, 24 and other actuators are shut off.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. A control apparatus of a continuously variable transmission for a vehicle having a primary pulley to which a power of an engine of said vehicle is inputted and whose groove width is variable, a secondary pulley whose groove width is variable, a power transmission element wound around said primary pulley and said secondary pulley, for changing said groove widths of said primary and secondary pulleys by regulating a line pressure supplied from a hydraulic pump driven by said engine of said vehicle and for continuously varying said power of said engine, comprising:

an engine switch member for controlling a start and a stop of said engine;

a vehicle speed detecting means for detecting a vehicle speed of said vehicle;

an engine speed detecting means for detecting an engine speed of said engine;

a line pressure reduction mode for reducing said line pressure;

a line pressure reduction mode establishing means for establishing said line pressure to said line pressure reduction mode when said vehicle speed detected by said vehicle speed detecting means is smaller than a first specified value and when said engine speed detected by said engine speed detecting means is smaller than a second specified value and when said engine switch member is turned off to stop said engine.

2. The control apparatus according to claim 1 wherein said line pressure is released from said line pressure reduction mode when a specified time elapses since said mode is established.

3. The control apparatus according to claim 1 wherein said line pressure is drained when said line pressure reduction mode is established.

* * * * *